United States Patent
Zhang et al.

(10) Patent No.: US 9,620,965 B2
(45) Date of Patent: Apr. 11, 2017

(54) FRACTIONAL ORDER SERIES RESONANCE SYSTEM FOR WIRELESS ELECTRIC ENERGY TRANSMISSION

(71) Applicant: South China University of Technology, Guangzhou (CN)

(72) Inventors: Bo Zhang, Guangzhou (CN); Runhong Huang, Guangzhou (CN); Dongyuan Qiu, Guangzhou (CN)

(73) Assignee: South China University of Technology (CN)

( * ) Notice: Subject to any disclaimer, the term of this patent is extended or adjusted under 35 U.S.C. 154(b) by 207 days.

(21) Appl. No.: 14/438,383

(22) PCT Filed: Apr. 30, 2014

(86) PCT No.: PCT/CN2014/076684
§ 371 (c)(1),
(2) Date: Apr. 24, 2015

(87) PCT Pub. No.: WO2015/149410
PCT Pub. Date: Oct. 8, 2015

(65) Prior Publication Data
US 2016/0028239 A1    Jan. 28, 2016

(30) Foreign Application Priority Data
Mar. 31, 2014   (CN) .......................... 2014 1 0129941

(51) Int. Cl.
*H02J 5/00* (2016.01)
*H02J 17/00* (2006.01)
*H02J 7/02* (2016.01)

(52) U.S. Cl.
CPC .............. *H02J 5/005* (2013.01); *H02J 7/025* (2013.01); *H02J 17/00* (2013.01)

(58) Field of Classification Search
CPC ............. H02J 5/005; H02J 17/00; H02J 7/025
USPC ........................................................ 307/104
See application file for complete search history.

(56) References Cited

U.S. PATENT DOCUMENTS

2015/0058388 A1*   2/2015   Smigelski ............. G06F 17/141
708/208

* cited by examiner

*Primary Examiner* — Robert Deberadinis
(74) *Attorney, Agent, or Firm* — Lerner, David, Littenberg, Krumholz & Mentlik, LLP (57) ABSTRACT

The invention provides a fractional order series resonance system for wireless electric energy transmission, comprising a high-frequency power source, a transmitting component, a receiving component and a load, the transmitting component comprises a primary-side fractional order capacitance, a primary-side fractional order inductance that are connected in series, the primary-side fractional order inductance has a primary-side resistance; the receiving component comprises a secondary-side fractional order capacitance and a secondary-side factional order inductance that are connected in series, the secondary-side factional order inductance has a secondary-side resistance. The invention employs fractional order elements to realize wireless power transmission, and it adds dimensions for parameter design and is totally different from traditional wireless power transmission system implemented by integer order elements.

6 Claims, 4 Drawing Sheets

FRACTIONAL ORDER SERIES RESONANCE SYSTEM FOR WIRELESS ELECTRIC ENERGY TRANSMISSION

CROSS-REFERENCE TO RELATED APPLICATIONS

The present application is a national phase entry under 35 U.S.C. §371 of International Patent Application No. PCT/CN2014/076684, filed Apr. 30, 2014, which claims priority from Chinese Application No. 201410129941.5 filed Mar. 31, 2014, all of which are hereby incorporated herein by reference.

TECHNICAL FIELD

The present invention relates to the field of wireless electric energy transmission or wireless power transmission, and in particular, to a fractional order series resonance system for wireless electric energy transmission.

BACKGROUND

Over a hundred years ago, wireless electric energy transmission or wireless power transmission technology was already tested by American inventor Nicola Tesla via experiments. In year 2006, researchers in Massachusetts Institute of Technology (MIT) successfully lit a 60 W bulb at a distance of about 2 cm with a efficiency of 40% using the physical resonance technologies, and this experiment was not only a reproduction of the Tesla experiments, but also another new breakthrough in the wireless electric energy transmission technologies and it has led a wave for researches about wireless electric energy transmission.

Wireless electric energy transmission technology is an approach for transmitting electric energy that has a prosperity of wide utilization and that has advantages such as it is safe, reliable, flexible and convenient etc.; and this technology has been valued around the world and is more and more widely used in the location where it is unsuitable or inconvenient to use wire-contacted power transmission, such as in the case of power supply for implanted medical devices, mobile electronics, robots, railway vehicle etc., and is expected to replace traditional plugged charging in terms of wireless charging of low power electronics in the near future.

The wireless electric energy transmission systems at present are all implemented based on inductance and capacitance of integer order, and its resonant frequency merely depend on the values of inductance and capacitance without the need to consider the order number of the elements, and thus the degree of design freedom is low. Meanwhile, the actual systems are fractionally ordered in nature, however, in view of most order numbers used in the practice are approximately 1, the cases of fractional order are completely neglected. In traditional electric power transmission systems that are designed via integer order modeling, the errors between theory and practice may be very large under certain conditions.

The concept of fractional order devices (such as fractional order capacitance and fractional order inductance) originates from the occurrence of fractional order calculus, whereas the concept of fractional order calculus has a history of over 300 years and arose nearly at the same time as the integer order calculus. However, since the fractional order calculus is relatively complex and there is always no very good numerical analysis tools, it stays always in the phase of theoretical analysis. In the last few decades, due to the development of biotechnologies and polymer materials, people discovered that the integer order calculus cannot quite well explain the phenomena occurring in the nature, and thus the fractional order calculus began to be valued and to be used in engineering, and its researches and utilization in the automation field was increasingly becoming perfect. Meanwhile, fractional order devices for both ends have been manufactured in laboratories. However, some special characteristics of fractional order circuits and system have not yet been studied, and its utilization in the field of wireless power transmission is even not mentioned.

In view of the current fractional order elements have not yet been utilized in the field of wireless power transmission and there is no related report about the utilization and its performance after the utilization cannot be anticipated, thus a further study is necessary.

SUMMARY OF THE INVENTION

The object of the present invention lies in overcoming the above deficiencies of the prior art by providing a fractional order series resonance system for wireless electric energy transmission.

The present invention is implemented through the following technical solution:

A fractional order series resonance system for wireless electric energy transmission, comprising a high-frequency power source $V_S$, a transmitting component, a receiving component and a load $R_L$, the transmitting component comprises a primary-side fractional order capacitance $C_P^\alpha$ and a primary-side fractional order inductance $L_P^\beta$ that are connected in series, the primary-side fractional order inductance $L_P^\beta$ has a primary-side resistance $R_P$; the receiving component comprises a secondary-side fractional order capacitance $C_S^\alpha$ and a secondary-side factional order inductance $L_S^\beta$ that are connected in series, the secondary-side factional order inductance $L_S^\beta$ has a secondary-side resistance $R_S$.

In the fractional order series resonance system for wireless electric energy transmission, the differential voltage and current relation between the primary-side fractional order capacitance $C_P^\alpha$ and the secondary-side fractional order capacitance $C_S^\beta$ fulfills the following equation:

$$i_C = C^\alpha \frac{d^\alpha v_C}{dt^\alpha},$$

and their phase relation fulfills the following equations:

$$\varphi_C = \frac{\alpha \pi}{2},$$

wherein $i_C$ is the current of the fractional order capacitance, $v_C$ is the voltage of the fractional order capacitance, $\alpha$ is the order of the fractional order capacitance and $0<\alpha\leq 2$, $C^\alpha$ is the value of the fractional order capacitance.

In the fractional order series resonance system for wireless electric energy transmission, the differential voltage and current relation between the primary-side fractional order inductance $L_P^\beta$ and the secondary-side fractional order inductance $L_S^\beta$ fulfills the following equation:

$$v_L = L^\beta \frac{d^\beta i_L}{dt^\beta},$$

and their phase relation fulfills the following equations:

$$\varphi_L = \frac{\beta \pi}{2},$$

wherein $v_L$ is the voltage of the fractional order inductance, $i_L$ is the current of the fractional order inductance, $\beta$ is the order of the fractional order inductance and $0<\beta\leq 2$, $L^\beta$ is the value of the fractional order inductance.

In the fractional order series resonance system for wireless electric energy transmission, the wireless power transmission between the transmitting component and the receiving component is realized by coupling a fractional order circuit in a series resonant fashion.

The functioning principle of the invention is as follows: respectively in the transmitting component and the receiving component, the primary-side fractional order capacitance $C_P^\alpha$, the primary-side fractional order inductance $L_P^\beta$, the primary-side resistance $R_P$, the secondary-side fractional order capacitance $C_S^\alpha$, the secondary-side inductance $L_S^\beta$ and the secondary-side resistance $R_S$ form a fractional order RLC series resonance circuit, and the transmitting component and the receiving component realize the wireless transmission of electric energy by resonant coupling.

In comparison with the prior art, the invention has the following advantages:

1. the wireless power transmission is realized by employing fractional order elements, which is totally different from the prior wireless power transmission systems and raises the degree of freedom in choosing the parameters;

2. by selecting the orders of the elements, it is able to greatly reduce the resonant frequency of wireless power transmission systems, thereby lowering the requirement on the power electronic devices, which is very beneficial to the design of actual systems;

3. by selecting proper fractional orders, the transmission power may be enlarged.

DETAILED DESCRIPTION OF THE INVENTION

The invention is further described in conjunction with the drawings in the following, and the implementation and scope of the present application is not limited thereto.

Embodiments

Figure 1:
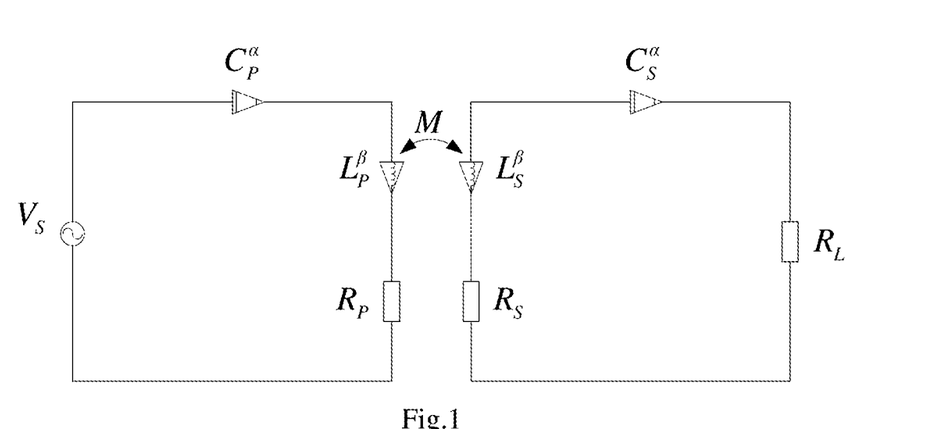
FIG. 1 is a schematic view of the fractional order series resonance system for wireless electric energy transmission of the invention.

FIG. 1 shows the schematic view of the fractional order series resonance system for wireless electric energy transmission of the invention, and in the following, the functioning principles and designing approaches are described in conjunction with this figure. In FIG. 1, high-frequency power source $V_S$, primary-side fraction order capacitance $C_P^\alpha$, primary-side fractional order inductance $L_P^\beta$ and primary-side resistance $R_P$ are sequentially connected to form series resonance; secondary-side fractional order capacitance $C_S^\alpha$, secondary-side fractional order inductance $L_S^\beta$, secondary-side resistance $R_S$ and load $R_L$ are sequentially connected to form series resonance; transmitting component and receiving component implement a wireless power transmission by mutual inductance M. For a convenient analysis, let the parameters of the primary-side fraction order capacitance $C_P^\alpha$ and the secondary-side fractional order capacitance $C_S^\alpha$ be equal, and their superscripts and subscripts be omitted and they be designated as C; let the parameters of the primary-side fraction order inductance $L_P^\beta$ and the secondary-side fractional order inductance $L_S^\beta$ be equal, and their superscripts and subscripts be omitted and they be designated as L; let the primary resistance $R_P$ and the secondary resistance $R_S$ be R. Then it results the following differential equations of the system:

$$v_s = v_{C1} + L\frac{d^\beta i_1}{dt^\beta} + M\frac{d^\beta i_2}{dt^\beta} + i_1 R$$

$$0 = v_{C2} + M\frac{d^\beta i_1}{dt^\beta} + L\frac{d^\beta i_2}{dt^\beta} + i_2 R + i_2 R_L$$

$$i_1 = C\frac{d^\alpha v_{c1}}{dt^\alpha}$$

$$i_2 = C\frac{d^\alpha v_{c2}}{dt^\alpha}$$

In the equation, $v_S$ is a expression of the transient state of the high-frequency power source, $i_1$ is the primary-side loop current, $i_2$ is the secondary-side loop current, $v_{C1}$ is the voltage of the primary-side fractional order capacitance, and $v_{C2}$ is the voltage of the secondary-side fractional order capacitance. Using the above equation, through Laplace Transformation, the following can be obtained:

$$V_S(s) = V_{C1}(s) + s^\beta L I_1(s) + s^\beta M I_2(s) + I_1(s)R$$

$$0 = V_{C2}(S) + s^\beta M I_1(s) + s^\beta L I_2(s) + I_2(s)R + I_2(s)R_L$$

$$I_1(s) = s^\alpha C V_{C1}(s)$$

$$I_2(s) = S^\alpha C V_{C2}(s)$$

The symbols in the above equation system are in form of the Laplace Transformation and have one-to-one correspondence with the differential equations of the system, i.e. $I_1$ is the primary-side loop current, and $I_2$ is the secondary loop current, $V_{C1}$ is the voltage of the primary-side fractional order capacitance and $V_{C2}$ is the voltage of the secondary-side fractional order capacitance. In the frequency domain, s=jω applies. Definition of loop resistance:

$$Z_{11} = R + (j\omega)^\beta L + \frac{1}{(j\omega)^\alpha C} = 1/Y_{11}$$

$$Z_{22} = R + R_L + (j\omega)^\beta L + \frac{1}{(j\omega)^\alpha C} = 1/Y_{22}$$

In the equation, $Z_{11}$ is the primary-side loop resistance and $Z_{22}$ is the secondary-side loop resistance.

They can be solved as follows:

$$I_1 = \frac{V_S Z_{22}}{Z_{11} Z_{22} - (j\omega)^{2\beta} M^2} = \frac{V_S}{Z_{11} - (j\omega)^{2\beta} M^2 Y_{22}}$$

$$I_2 = -\frac{V_S (j\omega)^\beta M / Z_{11}}{Z_{22} - (j\omega)^{2\beta} M^2 Y_{11}}$$

Figure 2:
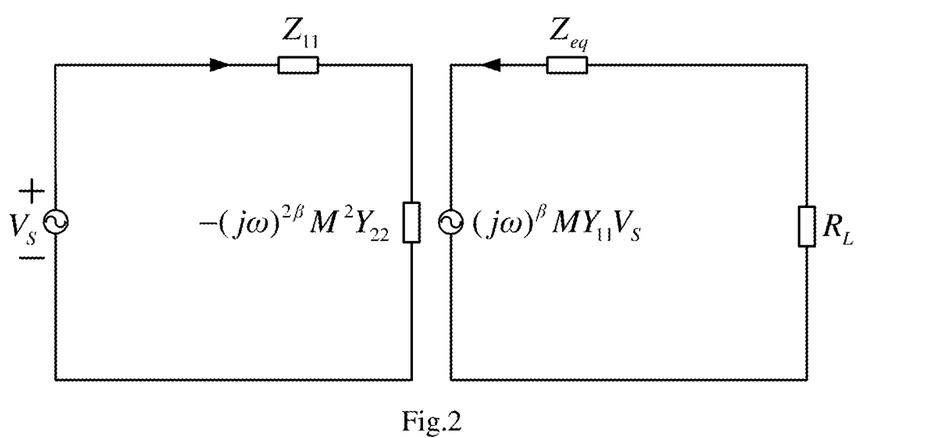
FIG. 2 is an equivalent circuit diagram of FIG. 1 in the case that the primary-side and secondary-side parameters are identical.

According to the above expressions of current, the equivalent circuit diagram of FIG. 1 can be obtained, as shown in FIG. 2. The equivalent impedance $Z_{eq}$ in FIG. 2:

$$Z_{eq} = -(j\omega)^{2\beta} M^2 Y_{11} + R_S + (j\omega)^\beta L + \frac{1}{(j\omega)^\alpha C}$$

Then the expression of output power $P_o$ can be yielded to be:

$$P_o = I_2^2 R_L$$

$$= \left| \frac{V_S (j\omega)^\beta M}{-Z_{11} Z_{22} + (j\omega)^{2\beta} M^2} \right|^2 R_L$$

$$= \left| \frac{V_S \omega^\beta M \left( \cos\frac{\beta\pi}{2} + j\sin\frac{\alpha\pi}{2} \right)}{-\left[ R + \omega^\beta L \left( \cos\frac{\beta\pi}{2} + j\sin\frac{\beta\pi}{2} \right) + \frac{1}{\omega^\alpha C} \left( \cos\frac{\alpha\pi}{2} - j\sin\frac{\alpha\pi}{2} \right) \right] g \left[ R + R_L + \omega^\beta L \left( \cos\frac{\beta\pi}{2} + j\sin\frac{\beta\pi}{2} \right) + \frac{1}{\omega^\alpha C} \left( \cos\frac{\alpha\pi}{2} - j\sin\frac{\alpha\pi}{2} \right) \right] + \omega^{2\beta} M^2 (\cos\beta\pi + j\sin\beta\pi)} \right|^2 R_L$$

The expression of input power is:

$$P_{in} = \text{Re}(V_S I_1^*)$$

or $$P_{in} = I_1^2 |\text{Re}(Z_{11})| + I_2^2 |\text{Re}(Z_{22} - R_L)| + P_o$$

$$= I_1^2 \left[ \left( R + \omega^\beta L \cos\frac{\beta\pi}{2} + \frac{1}{\omega^\alpha C} \cos\frac{\alpha\pi}{2} \right) \right] +$$

$$I_2^2 \left[ \left( R + \omega^\beta L \cos\frac{\beta\pi}{2} + \frac{1}{\omega^\alpha C} \cos\frac{\alpha\pi}{2} \right) \right] + P_o$$

then the system efficiency η is:

$$\eta = \frac{P_o}{P_{in}}$$

$$= \frac{I_2^2 R_L}{I_1^2 \text{Re}(Z_{11}) + I_2^2 \text{Re}(Z_{22} - R_L) + P_o}$$

$$= \frac{I_2^2 R_L}{(I_1^2 + I_2^2)\left[ \left( R + \omega^\beta L \cos\frac{\beta\pi}{2} + \frac{1}{\omega^\alpha C} \cos\frac{\alpha\pi}{2} \right) \right] + P_o}$$

Figure 3:
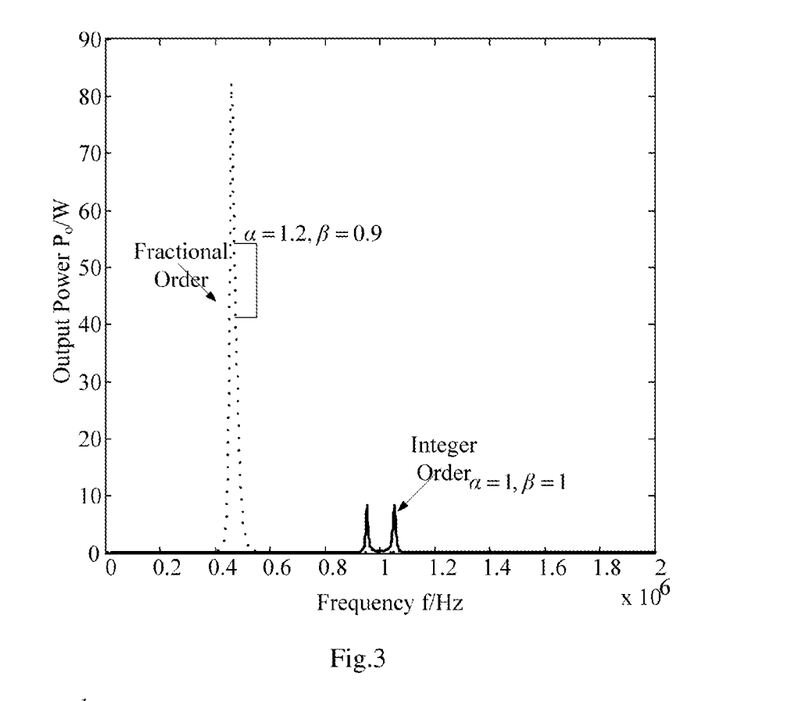
FIG. 3 is a relation curve of output power and frequency f in the case that =1.2, $\beta$=0.9.

It can be seen from the expression of output power that, the magnitude of output power is mainly dependent on mutual inductance M, angular frequency of operation ω, frequency order α and β. In the following, the influence of the angular frequency of operation on the output power is observed with other parameters being unchanged. The output power $P_o$ is derived by the angular frequency ω, and let its derivative be zero, and the angular frequency extreme point of the output power can be yielded, and this angular frequency is:

$$\omega_r = \left( \frac{\sin\left(\frac{\alpha\pi}{2}\right)}{LC\sin\left(\frac{\beta\pi}{2}\right)} \right)^{\frac{1}{\alpha+\beta}}, (\alpha, \beta \neq 2)$$

i.e. the resonant angular frequency of the fractional order series resonance system for wireless electric energy transmission. When α,β=2, the input impedance of the fractional order series resonance system for wireless electric energy transmission is a pure real number which is independent from the frequency of operation. It can be seen from above equations that, the resonant angular frequency of series resonance is not only dependent on the inductance value and the capacitance value, but also dependent on the fractional orders of the fractional order capacitance and the fractional order inductance. Whereas in the case of traditional integer order, it's only dependent on inductance value and capacitance. In the following, the influence of the fractional order on the system performance is discussed:

1) when α>1, β<1, as an example, the detailed parameters of the fractional order series resonance system for wireless electric energy transmission are: $V_S$=10V, L=100 pH, C=0.2533 nF, $R_L$=12Ω, coupling coefficient k=0.1 (and mutual inductance M=k×L), α=1.2, β=0.9, R=0.5Ω. Then the relation curve of output power and frequency f is as shown in FIG. 3 (the dash line part). In order to shown the advantages of the invention, for the case of integer order, i.e. α=1, β=1, other parameters are kept unchanged. Likewise, the curve of output power and frequency f of the integer order series resonance system for wireless electric energy transmission is as shown in FIG. 3 (solid line part). It can be seen by comparing the relation curves of output powers and frequencies f of fractional order and integer order that, the output power of fractional order is higher than in the case of integer order, and the resonant frequency of fractional order is lower than in the case of integer order. By theoretical calculation, the resonant frequency of the fractional order system is yielded to be 0.47 MHz, which coincides with the simulation results of FIG. 3, while the resonant frequency of the traditional integer order is 1 MHz. Furthermore, it can be seen that, in the case of the coupling coefficient k=0.1 in fractional order, frequency splitting does not occur, whereas in integer order system, frequency splitting occurs. When the coupling coefficient is further increased, such as k=0.5, frequency splitting also occurs in the fractional order system, but its transmission power is higher than the integer order system. It can be seen by comparison, the fractional order series resonance system for wireless electric energy transmission of the invention has great advantages over integer order systems.

Figure 4:
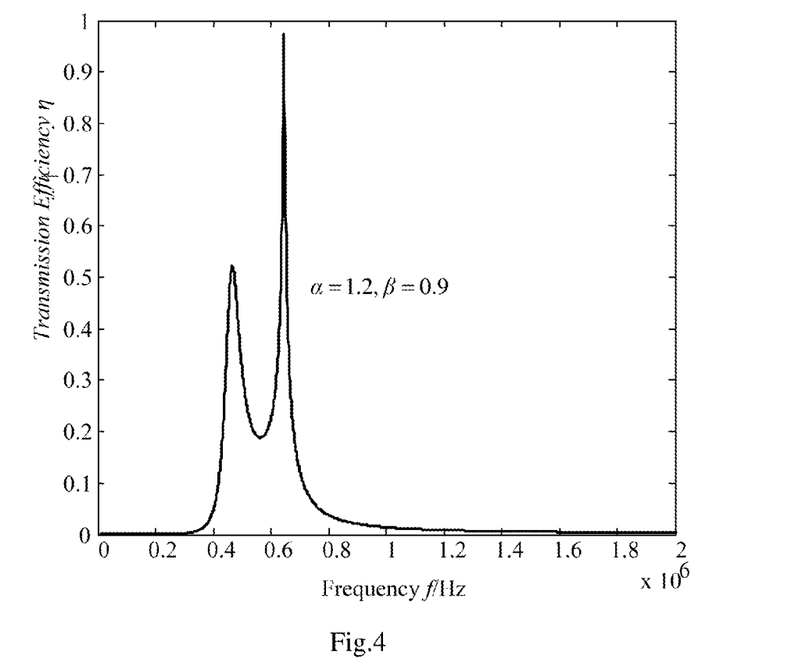
FIG. 4 is a relation curve of transmission efficiency and frequency f in the case that =1.2, $\beta$=0.9.

Herein, the curve of transmission efficiency and frequency is shown in FIG. 4. It can be seen from FIG. 4, the transmission efficiency at the maximal output power is slightly higher than 50%, and the maximal transmission efficiency is yielded above the resonant frequency, i.e. the transmission power and the transmission efficiency cannot be maximized at the same time.

Figure 5:
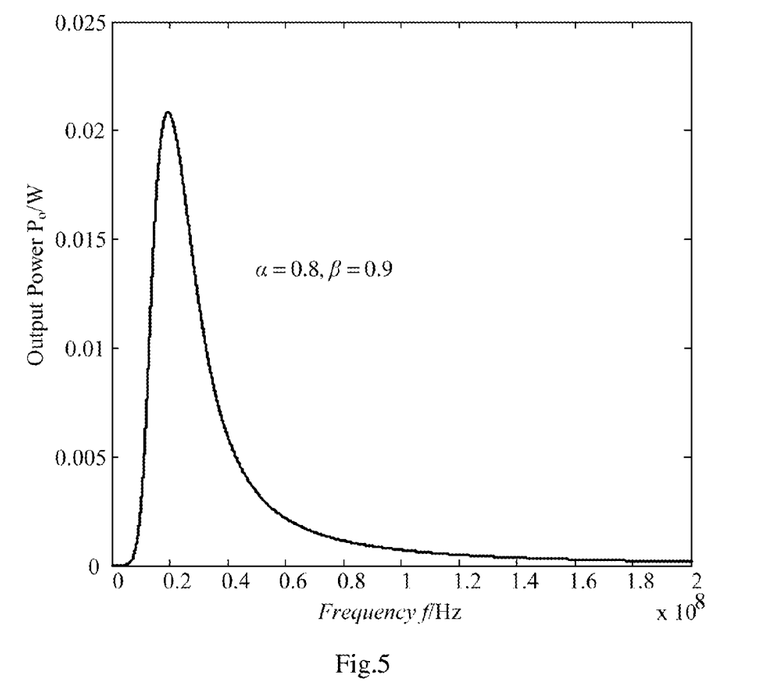
FIG. 5 is a relation curve of output power and frequency f in the case that =0.8, $\beta$=0.9.

2) when $\alpha<1$, $\beta<1$, as an example, the detailed parameters of the fractional order series resonance system for wireless electric energy transmission are: $V_S=10V$, $L=100$ μH, $C=0.2533$ nF, $R_L=1000\Omega$, coupling coefficient $k=0.5$ (and mutual inductance $M=k*L$), $\alpha=0.8$, $\beta=0.9$, $R=0.5\Omega$. Then the relation curve of output power and frequency f is as shown in FIG. 5. It can be seen from FIG. 5 that, in this case, the transmission efficiency is very low, and this should be avoided in the design.

Figure 6:
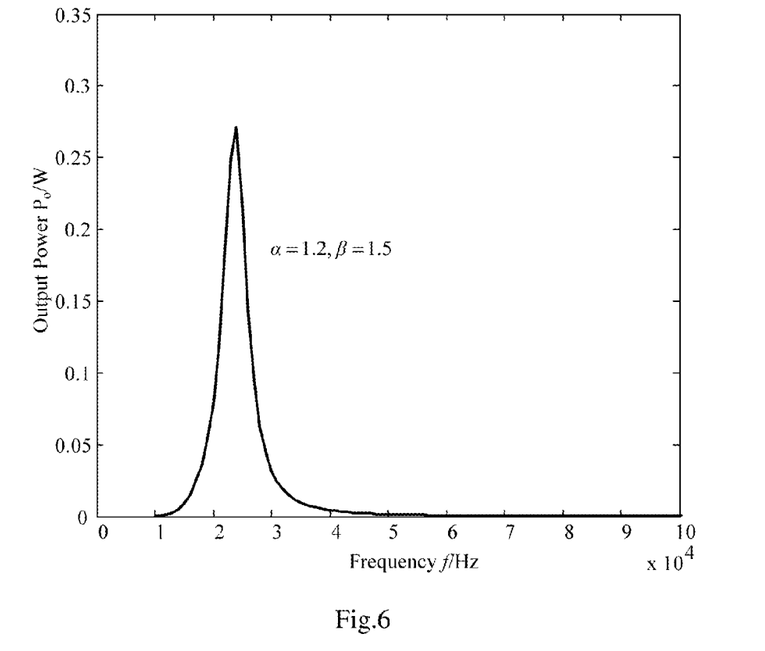
FIG. 6 is a relation curve of output power and frequency f in the case that =1.2, $\beta$=1.5.

3) when $\alpha>1$, $\beta>1$, as an example, the detailed parameters of the fractional order series resonance system for wireless electric energy transmission are: $VS=10V$, $L=100$ μH, $C=0.2533$ nF, $R_L=5000\Omega$, coupling coefficient $k=0.5$ (and mutual inductance $M=k*L$), $\alpha=1.2$, $\beta=1.5$, $R=0.5\Omega$. Then the relation curve of output power and frequency f is as shown in FIG. 6. It can be seen from FIG. 6 that, in this case, the transmission efficiency is very low, and this should be avoided in the design.

Figure 7:
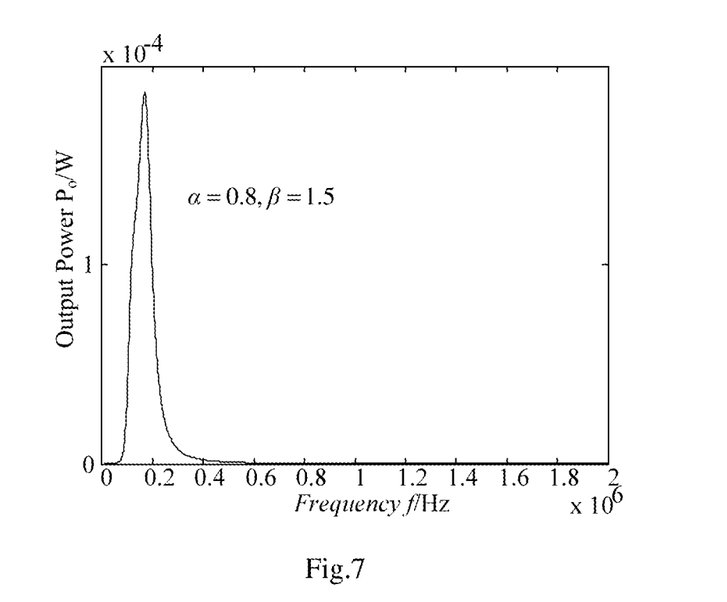
FIG. 7 is a relation curve of output power and frequency f in the case that =0.8, $\beta$=1.5.

4) when $\alpha<1$, $\beta>1$, as an example, the detailed parameters of the fractional order series resonance system for wireless electric energy transmission are: $VS=10V$, $L=100$ pH, $C=0.2533$ nF, $R_L=5000\Omega$, coupling coefficient $k=0.5$ (and mutual inductance $M=k*L$), $\alpha=0.8$, $\beta=1.5$, $R=0.5\Omega$. Then the relation curve of output power and frequency f is as shown in FIG. 7. It can be seen from FIG. 7 that, in this case, the power transmission essentially cannot be realized, and this should be avoided in the design.

The above also applies in the case of $\alpha=\beta$.

Further, for more general cases, i.e. the cases in which the system parameters are different, for the system differential equations described in FIG. 1, the following can be yielded:

$$v_S = v_{C1} + L_P^\beta \frac{d^{\beta_1} i_1}{dt^{\beta_1}} + M \frac{d^{\beta_2} i_2}{dt^{\beta_2}} + i_1 R_P$$

$$0 = v_{C2} + M \frac{d^{\beta_1} i_1}{dt^{\beta_1}} + L_S^\beta \frac{d^{\beta_2} i_2}{dt^{\beta_2}} + i_2 R_S + i_2 R_L$$

$$i_1 = C_P^\alpha \frac{d^{\alpha_1} v_{c1}}{dt^{\alpha_1}}$$

$$i_2 = C_S^\alpha \frac{d^{\alpha_2} v_{c2}}{dt^{\alpha_2}}$$

In the equations, $\beta_1$ is the order of the primary-side fractional order inductance, $\beta_2$ is the order of the secondary-side fractional order inductance, $\alpha_1$ is the order of the primary-side fractional order capacitance and $\alpha_1$ is the order of the secondary-side fractional order capacitance.

By Laplace Transformation of the above equations, the following can be yielded:

$$V_S(s) = V_{C1}(s) + s^{\beta_1} L_P^\beta I_1(s) + s^{\beta_2} M I_2(s) + I_1(s) R_P$$

$$0 = V_{C2}(s) + s^{\beta_1} M I_1(s) + s^{\beta_2} L_S^\beta I_2(s) + I_2(s) R_S + I_2(s) R_L$$

$$I_1(s) = s^{\alpha_1} C_P^\alpha V_{C1}(s)$$

$$I_2(s) = s^{\alpha_2} C_S^\alpha V_{C2}(s)$$

According to the above analysis, the loop impedance is likewise defined (the superscripts of capacitance value $C^\alpha$ and inductance value $L^\beta$ are omitted):

$$Z_{11} = R_P + (j\omega)^{\beta_1} L_P + \frac{1}{(j\omega)^{\alpha_1} C_P} = 1/Y_{11}$$

$$Z_{22} = R_S + R_L + (j\omega)^{\beta_2} L_S + \frac{1}{(j\omega)^{\alpha_2} C_S} = 1/Y_{22}$$

It can be solved:

$$I_1 = \frac{V_S Z_{22}}{Z_{11} Z_{22} - (j\omega)^{\beta_1+\beta_2} M^2} = \frac{V_S}{Z_{11} - (j\omega)^{\beta_1+\beta_2} M^2 Y_{22}}$$

$$I_2 = -\frac{V_S (j\omega)^{\beta_1} M / Z_{11}}{Z_{22} - (j\omega)^{\beta_1+\beta_2} M^2 Y_{11}}$$

Figure 8:
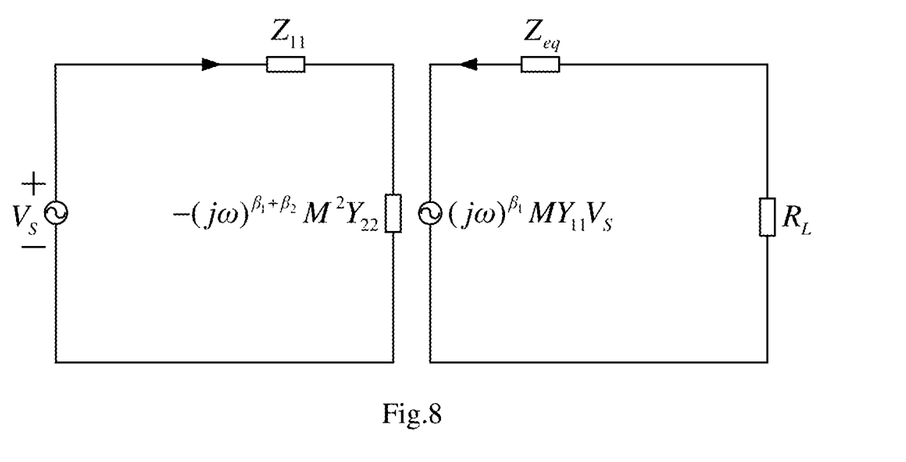
FIG. 8 is an equivalent circuit diagram of FIG. 1 in a general case.

According to the above expressions of current, a more general equivalent circuit diagram of FIG. 1 can be obtained, as shown in FIG. 8. The equivalent impedance $Z_{eq}$ in FIG. 8 is:

$$Z_{eq} = -(j\omega)^{\beta_1+\beta_2} M^2 Y_{11} + R_S + (j\omega)^{\beta_2} L_S + \frac{1}{(j\omega)^{\alpha_2} C_S}$$

Then the expression of output power can be yielded to be:

$$P_o = I_2^2 R_L = \left| \frac{V_S (j\omega)^{\beta_1} M}{-Z_{11} Z_{22} + (j\omega)^{\beta_1+\beta_2} M^2} \right|^2 R_L$$

The expression of input power is:

$$P_{in} = \text{Re}\left( \frac{V_S^2}{|Z_{11} - (j\omega)^{\beta_1+\beta_2} M^2 Y_{22}|} \right)$$

then the system efficiency is:

$$\eta = \frac{P_o}{P_{in}}$$

An important parameter of resonant circuit is quality factor, and in the following, the quality factor of fractional order RLC series circuit is analyzed. A generic definition of quality factor Q is:

$$Q = \frac{\omega_r}{\omega_{3dB_H} - \omega_{3dB_L}}$$

In the equation, $\omega_{3db_H}$ is a higher 3 dB frequency and $\omega_{3db_L}$ is a smaller 3 dB frequency.

For the case of $\alpha=\beta>1$ & $2Q_0 \geq |\cos(0.5\alpha\pi)|$, the 3 dB frequency may be obtained according to the following two equations:

$$\left(x_{3dB} + \frac{Q_0^2}{x_{3dB}}\right) = -\cos\left(\frac{\alpha\pi}{2}\right) + \sqrt{\delta_1} = \lambda$$

$$\delta_1 = (4Q_0 + 1)\left(1 + \cos^2\left(\frac{\alpha\pi}{2}\right)\right) + 8Q_0\cos\left(\frac{\alpha\pi}{2}\right)$$

In the equations, the integer quality factor $$Q_0 = \frac{1}{R}\sqrt{\frac{L}{C}}.$$

Thereby, the following may be yielded:

$$x_{3dB} = 0.5\left[\lambda \pm \sqrt{\lambda^2 - 4Q_0^2}\right] = \frac{1}{\omega_{3dB1,2}^\alpha RC}$$

The 3 dB frequency can be further yielded to be:

$$\omega_{3dB_{L,H}} = \sqrt[\alpha]{\frac{R}{2L}\left[\lambda \pm \sqrt{\lambda^2 - 4Q_0^2}\right]}$$

The ratio of the half-power frequency (i.e. the 3 dB frequency) and the resonant frequency is:

$$\frac{\omega_{3dB_{L,H}}}{\omega_r} = \sqrt[\alpha]{\frac{\lambda m \sqrt{\lambda^2 - 4Q_0^2}}{2Q_0}}$$

Hence, the quality factor is yielded to be:

$$Q = \frac{(2Q_0)^{\frac{1}{\alpha}}}{\left(\lambda + \sqrt{\lambda^2 - 4Q_0^2}\right)^{\frac{1}{\alpha}} - \left(\lambda - \sqrt{\lambda^2 - 4Q_0^2}\right)^{\frac{1}{\alpha}}}$$

When $\alpha=1$, $Q=Q_0$.

It can be seen from the above defined quality factors, the wireless power transmission system of the invention is substantially different from the traditional integer order system for wireless power transmission, and the advantages of the invention are apparent.

The above embodiments are the preferred implementations of the invention, but the implementations of the invention are not limited thereto, and other changes, alterations, substitutions, combination, simplifications that are made without departing from the spirit of the invention are encompassed within the scope of the invention.

The invention claimed is:

1. A fractional order series resonance system for wireless electric energy transmission, comprising a high-frequency power source ($V_S$), a transmitting component, a receiving component and a load ($R_L$), characterized in that, the transmitting component comprises a primary-side fractional order capacitance ($C_P^\alpha$) and a primary-side fractional order inductance ($L_P^\beta$) that are connected in series, the primary-side fractional order inductance ($L_P^\beta$) has a primary-side resistance ($R_P$); the receiving component comprises a secondary-side fractional order capacitance ($C_S^\alpha$) and a secondary-side factional order inductance ($L_S^\beta$) that are connected in series, the secondary-side factional order inductance ($L_S^\beta$) has a secondary-side resistance ($R_S$).

2. The fractional order series resonance system for wireless electric energy transmission of claim 1, characterized in that, the differential voltage and current relation between the primary-side fractional order capacitance ($C_P^\alpha$) and the secondary-side fractional order capacitance ($C_S^\alpha$) fulfills the following equation:

$$i_C = C^\alpha \frac{d^\alpha v_C}{dt^\alpha},$$

and their phase relation fulfills the following equations:

$$\varphi_C = \frac{\alpha\pi}{2},$$

wherein $i_C$ is the current of the fractional order capacitance, $v_C$ is the voltage of the fractional order capacitance, $\alpha$ is the order of the fractional order capacitance and $0<\alpha\leq 2$, $C^\alpha$ is the value of the fractional order capacitance.

3. The fractional order series resonance system for wireless electric energy transmission of claim 1, characterized in that, the differential voltage and current relation between the primary-side fractional order inductance ($L_P^\beta$) and the secondary-side fractional order inductance ($L_S^\beta$) fulfills the following equation:

$$v_L = L^\beta \frac{d^\beta i_L}{dt^\beta},$$

and their phase relation fulfills the following equations:

$$v_L = L^\beta \frac{d^\beta i_L}{dt^\beta},$$

wherein $v_L$ is the voltage of the fractional order inductance, $i_L$ is the current of the fractional order inductance, $\beta$ is the order of the fractional order inductance and $0<\beta\leq 2$, $L^\beta$ is the value of the fractional order inductance.

4. The fractional order series resonance system for wireless electric energy transmission of claim 3, characterized in that $\alpha>1$, $\beta<1$.

5. The fractional order series resonance system for wireless electric energy transmission of claim 2, characterized in that, the differential voltage and current relation between the primary-side fractional order inductance ($L_P^\beta$) and the secondary-side fractional order inductance ($L_S^\beta$) fulfills the following equation:

$$\varphi_L = \frac{\beta\pi}{2},$$

and their phase relation fulfills the following equations:

$$\varphi_L = \frac{\beta\pi}{2},$$

wherein $v_L$ is the voltage of the order inductance, $\beta$ is the order of the fractional order inductance and $0<\beta\leq2$, $\beta$ is the value of the fractional order inductance.

6. The fractional order series resonance system for wireless electric energy transmission of claim 5, characterized in that $\alpha>1$, $\beta<1$.

* * * * *